United States Patent
Miyanaga (10) Patent No.: US 9,809,456 B2
(45) Date of Patent: Nov. 7, 2017

(54) MANUFACTURING METHOD FOR POSITIVE ELECTRODE ACTIVE MATERIAL

(75) Inventor: Akiharu Miyanaga, Kanagawa (JP)

(73) Assignee: Semiconductor Energy Laboratory Co., LTD., Kanagawa-ken (JP)

(*) Notice: Subject to any disclaimer, the term of this patent is extended or adjusted under 35 U.S.C. 154(b) by 460 days.

(21) Appl. No.: 12/846,000

(22) Filed: Jul. 29, 2010

(65) Prior Publication Data
US 2011/0031105 A1    Feb. 10, 2011

(30) Foreign Application Priority Data

Aug. 7, 2009  (JP) .................. 2009-184015

(51) Int. Cl.
  *C01B 25/37*  (2006.01)
  *B01J 19/12*  (2006.01)
  (Continued)

(52) U.S. Cl.
  CPC ............ *C01B 25/37* (2013.01); *B01J 19/126* (2013.01); *C01B 25/372* (2013.01);
  (Continued)

(58) Field of Classification Search
  CPC ..... C01B 25/37; C01B 25/375; C01B 25/372; B01J 19/126; B01J 2219/00141;
  (Continued)

(56) References Cited

U.S. PATENT DOCUMENTS 5,720,859 A * 2/1998 Czubarow et al. ...... 204/157.43
5,770,018 A * 6/1998 Saidi ........................ 204/157.51
(Continued)

FOREIGN PATENT DOCUMENTS

CN    001547273 A    11/2004
EP    0 913 876 A1    5/1999
(Continued)

OTHER PUBLICATIONS

Murugan et al, "One-pot microwave-hydrothermal synthesis and characterization of carbon-coated LiMPO4 (M = Mn, Fe, and Co) Cathodes," J. of the Electrochemical Society, vol. 156, issue 2, pp. A79-A83 (2009), published Nov. 25, 2008.*
(Continued)

*Primary Examiner* — Keith Hendricks
*Assistant Examiner* — Colleen M Raphael
(74) *Attorney, Agent, or Firm* — Nixon Peabody LLP; Jeffrey L. Costellia (57) ABSTRACT

It is an object to provide a manufacturing method for a large amount of positive electrode active material with few variations, having a highly uniform surface condition, micro-size, and high performance. An aqueous solution of a compound, which becomes the source material for the positive electrode active material, is put in an airtight container and irradiated with microwaves, thus heating while water in the airtight container is evaporated and a high pressure is formed in the air tight container. A large amount of micro-sized positive electrode active material having a highly uniform surface condition can be formed. A compound, which becomes the source material for the positive electrode active material, is put in an airtight container and irradiated with microwaves, thus heating while water in the airtight container is evaporated and a high pressure is formed in the air tight container.

8 Claims, 5 Drawing Sheets

(51) Int. Cl.
*C01B 25/45* (2006.01)
*H01M 4/58* (2010.01)

(52) U.S. Cl.
CPC ............ *C01B 25/375* (2013.01); *C01B 25/45* (2013.01); *B01J 2219/00141* (2013.01); *H01M 4/5825* (2013.01); *Y02E 60/122* (2013.01); *Y02P 70/54* (2015.11)

(58) Field of Classification Search
CPC .......... B01J 2219/1206; H01M 4/5824; Y02P 70/54; Y02E 60/122
USPC ............ 204/157.43, 157.41, 157.45, 157.51, 204/157.5, 157.52
See application file for complete search history.

(56) References Cited

U.S. PATENT DOCUMENTS

| | | | |
|---|---|---|---|
| 5,951,831 A * | 9/1999 | Godber et al. | ............ 204/157.45 |
| 5,985,237 A | 11/1999 | Lu et al. | |
| 6,348,182 B1 | 2/2002 | Lu et al. | |
| 6,645,452 B1 | 11/2003 | Barker et al. | |
| 6,872,492 B2 | 3/2005 | Barker et al. | |
| 6,960,331 B2 | 11/2005 | Barker et al. | |
| 7,060,238 B2 | 6/2006 | Saidi et al. | |
| 7,807,121 B2 | 10/2010 | Nuspl et al. | |
| 7,998,618 B2 | 8/2011 | Nuspl et al. | |
| 8,241,521 B2 * | 8/2012 | Jin | ............ C01B 25/45 252/182.1 |
| 8,795,894 B2 | 8/2014 | Sakai et al. | |
| 2002/0114754 A1* | 8/2002 | Hosoya | ............ H01M 4/366 423/306 |
| 2004/0016632 A1* | 1/2004 | Barker | ............ 204/157.4 |
| 2005/0121307 A1* | 6/2005 | Hargett et al. | ............ 204/157.45 |
| 2008/0131777 A1* | 6/2008 | Hatta | ............ C01B 25/45 252/182.1 |
| 2009/0117020 A1* | 5/2009 | Manthiram | ............ C01B 25/45 423/274 |
| 2009/0184296 A1* | 7/2009 | Isono et al. | ............ 252/521.5 |
| 2010/0086855 A1 | 4/2010 | Kohmoto et al. | |
| 2010/0304217 A1* | 12/2010 | Suzuki et al. | ............ 204/157.45 |
| 2011/0008233 A1 | 1/2011 | Miyanaga et al. | |

FOREIGN PATENT DOCUMENTS

| | | | |
|---|---|---|---|
| EP | 1574477 A | | 9/2005 |
| EP | 2239806 A | | 10/2010 |
| EP | 2277829 A | | 1/2011 |
| EP | 2336085 A | | 6/2011 |
| JP | 63086357 A | * | 4/1988 |
| JP | 10-130024 | | 5/1998 |
| JP | 10-152326 | | 6/1998 |
| JP | 11-511290 | | 9/1999 |
| JP | 2001-325959 A | | 11/2001 |
| JP | 2003-194683 A | | 7/2003 |
| JP | 2003-217584 A | | 7/2003 |
| JP | 2004-095385 A | | 3/2004 |
| JP | 2004-514639 | | 5/2004 |
| JP | 2004-533706 | | 11/2004 |
| JP | 2005-071807 A | | 3/2005 |
| JP | 2005-218953 A | | 8/2005 |
| JP | 2006-155941 A | | 6/2006 |
| JP | 2006-339104 A | | 12/2006 |
| JP | 2007-103298 A | | 4/2007 |
| JP | 2007-511458 | | 5/2007 |
| JP | 2007-230784 A | | 9/2007 |
| JP | 2008-260666 | | 10/2008 |
| JP | 2009-062256 A | | 3/2009 |
| JP | 2009-104970 | | 5/2009 |
| JP | 2009-104974 A | | 5/2009 |
| JP | 2011009190 A | * | 1/2011 |
| JP | 2011-054564 A | | 3/2011 |
| WO | WO-2002/044084 | | 6/2002 |
| WO | WO-2005/051840 | | 6/2005 |
| WO | WO-2006/057146 | | 6/2006 |
| WO | WO-2007/132930 | | 11/2007 |
| WO | WO 2009/053823 A2 | | 4/2009 |
| WO | WO-2009/096335 | | 8/2009 |

OTHER PUBLICATIONS

Chen et al, "Hydrothermal synthesis of cathode materials," J. Power Sources vol. 174 (2007) pp. 442-448.*
English-language abstract of JP 2011009190A.*
Wang et al, "Preparation and characterization of nano-sized LiFePO4 by low heating solid-state coordination method and microwave heating," Electrochim. Acta, vol. 52, pp. 6778-6783 (2007).*
Beninati et al, "MW-assisted synthesis of LiFePO4 for high power applications," J. Power Sources, vol. 180, pp. 875-879 (2008).*
English-language abstract of JP63086357A.*
Burba.C et al., "Vibrational spectroscopic investigation of structurally-related LiFePO4, NaFePO4, and FePO4 compounds,", Spectrochimica Acta Part A, 2006, No. 65, pp. 44-50.
Feng.P. et al., "Synthesis and Characterizations of a Polymorphic Sodium Cobalt Phosphate with Edge-Sharing CO2+ Octahedral Chains,", Journal of Solid State Chemistry, 1997, vol. 131, pp. 160-166.
Feng.P. et al., "Synthesis, Crystal Structure, and Magnetic Properties of a New Polymorphic Sodium Cobalt Phosphate with Trigonal Bipyramidal CO2+ and a Tunnel Structure,", Journal of Solid State Chemistry, 1997, vol. 129, pp. 328-333.
Erragh.F et al., "Sodium Nickel Polyphosphate,". Acta. Cryst.(Acta Crystallographica Section), 1998, vol. C54, pp. 1746-1747.
Balaji.S et al., "A review on microwave synthesis of electrode materials for lithium-ion batteries", Ionics, May 14, 2009, vol. 15, No. 6, pp. 765-777.
Ouyang.C et al., "First Principles Study on NaxLi1-xFePO4 As Cathode Material for Rechargeable Lithium Batteries", Chin.Phys. Lett, 2006, vol. 23, No. 1, pp. 61-64.
Park.S et al., "The effects of Na doping on performance of layered Li1.1-xNax[Ni0.2Co0.3Mn0.4]O2 materials for lithium secondary batteries", Materials Chemistry and Physics, Feb. 10, 2006, vol. 95, pp. 218-221, Elsevier.
Korean Office Action (Application No. 2010-0073029) Dated Nov. 6, 2015.
Murugan.A et al., "Comparison of Microwave Assisted Solvothermal and Hydrothermal Syntheses of LiFePO4/C Nanocomposite Cathodes for Lithium Ion Batteries", J. Phys. Chem. C (Journal of Physical Chemistry C), Sep. 18, 2008, vol. 112, No. 37, pp. 14665-14671.
(Higuchi.M), "Development of short time synthesis method for the lithium rechargeable battery material by microwave heating", Proceedings of the School of Engineering of Tokai University, 2005, vol. 45, No. 2, pp. 151-153, Tokai University.
Byoungwoo Kang, et al., "Battery Materials for Ultrafast Charging and Discharging", Nature, vol. 458, Mar. 12, 2009, pp. 190-193.
Shoufeng Yang, et al., "Hydrothermal Synthesis of Lithium Iron Phosphate Cathodes", Electrochemistry Communications, vol. 3, Issue 9, Aug. 17, 2001, pp. 505-508.
Uematsu. K et al., "Solid Chemical Reaction by Microwave Heating for the Synthesis of LiFePO4 Cathode Material", J. Ceram. Soc. Jpn.(Journal of the Ceramic Society of Japan), Jul. 1, 2007, vol. 115, No. 1343, pp. 450-454, CerSJ(the Ceramic Society of Japan).
Higuchi. M et al., "Synthesis of LiFePO4 cathode material by microwave processing", Journal of Power Sources, Jun. 1, 2003, vol. 119-121, pp. 258-261, Elsevier.
Preparation and Characterization of Li3V2(PO4)3 via Microwave Carbothermal Reduction Method, Xiyou Jinshu Cailiao Gongcheng, Nov. 1, 2006, vol. 35, No. 11, pp. 1792-1796.
Yang. G et al., "Microwave solid-state synthesis and electrochemical properties of carbon-free Li3V2(PO4)3 as cathode materials for lithium batteries", Electrochimica Acta, Mar. 1, 2010, vol. 55, No. 8, pp. 2951-2957.

* cited by examiner

MANUFACTURING METHOD FOR POSITIVE ELECTRODE ACTIVE MATERIAL

BACKGROUND OF THE INVENTION

1. Field of the Invention

The present invention relates to a method of manufacturing an active material used for a positive electrode of a secondary battery.

2. Description of the Related Art

In recent years, with an increase of environmental engineering, development of solar power generating technologies which pose less burden on the environment than conventional power generation methods has been actively conducted. Concurrently with the development of power generation technology, development of power storage technology has also been underway.

As a power storage technology, for instance, there is a lithium ion secondary battery (refer to Patent Documents 1 to 3). Lithium ion secondary batteries are widely prevalent since their energy density is high and because they are well suited for miniaturization. As a material used for a positive electrode of the lithium ion secondary battery, there is $LiFePO_4$ of orthorhombic olivine structure, for example.

It was thought that $LiFePO_4$ (lithium iron phosphate) of orthorhombic olivine structure would have favorable characteristics since the lithium (Li) is arranged one-dimensionally, but in actuality, for high speed charge and discharge, which is one of the characteristics required by a positive electrode material of a lithium ion secondary battery; when using the $LiFePO_4$ crystal having the orthorhombic olivine structure in a positive electrode active material, the assumed characteristic value (theoretical capacity) was not long satisfied. Recently however, according to Kang et al., by controlling the size and the crystal surface of the $LiFePO_4$ crystal, the characteristic value approximately equivalent to the theoretical capacity assumed in numerical calculation has been reportedly obtained (see Non-Patent Document 1).

REFERENCE

[Patent Document 1] Japanese Published Patent Application No. H10-130024

[Patent Document 2] Japanese Published Patent Application No. H10-152326

[Patent Document 3] Japanese Translation of PCT International Application No. H11-511290

[Non-Patent Document 1] B. Kang and G. Ceder, "Battery materials for ultrafast charging and discharging," Nature, 12 Mar. 2009, Vol. 458, p. 190

SUMMARY OF THE INVENTION

For improved characteristics of the conventional lithium ion secondary battery, it is known that it is effective to increase a surface area of an active material used for the positive electrode of the lithium ion secondary battery, and that by forming the active material of micro-sized crystal grains, the surface area can be increased. Actually however, since it is difficult to form a large amount of micro-sized positive electrode active material having a highly uniform surface condition, manufacture of a lithium ion secondary battery having good performance is hindered, as a result.

Therefore, it is an object to provide a manufacturing method for a large amount of positive electrode active material with few variations, having a highly uniform surface condition, micro-size, and high performance.

An embodiment of the present invention is that hydrothermal reaction under high pressure is used for manufacturing the positive electrode active material.

Another embodiment of the present invention is that an aqueous solution of a compound, which becomes the source material for the positive electrode active material, is put in an airtight container and irradiated with microwaves, thus heating while water in the airtight container is evaporated and a high pressure is formed in the air tight container.

Additionally, an embodiment of the present invention is that a compound, which becomes the source material for the positive electrode active material, is put in an airtight container and irradiated with microwaves, thus heating while water in the airtight container is evaporated and a high pressure is formed in the air tight container. Note that the compound which becomes the source material of the positive electrode active material is one or a plurality of compounds, and in the case that one compound becomes the source material of the positive electrode active material, the aforesaid compound is a hydrate. Furthermore, in the case that a plurality of compounds becomes the source material of the positive electrode active material, at least one of the aforesaid compounds is a hydrate.

As the positive electrode active material, there is lithium transition metal oxide, sodium transition metal oxide, lithium transition metal phosphate, sodium transition metal phosphate, and sodium lithium transition metal phosphate. As the transition metal, one or a plurality of iron, nickel, cobalt, manganese, vanadium, chromium, or titanium is preferred.

Examples of the compound which can be used as the lithium transition metal oxide are compounds such as lithium cobalt oxide, lithium nickel oxide, lithium manganese oxide, lithium cobalt vanadium oxide, and lithium nickel vanadium oxide.

Examples of the compound which can be used as the sodium transition metal oxide are compounds such as sodium cobalt oxide, sodium nickel oxide, sodium manganese oxide, sodium cobalt vanadium oxide, and sodium nickel vanadium oxide.

Examples of the compound which can be used as the lithium transition metal phosphate are compounds such as lithium iron phosphate, lithium nickel phosphate, lithium cobalt phosphate, lithium manganese phosphate, and lithium vanadium phosphate.

Examples of the compound which can be used as the sodium transition metal phosphate are compounds such as sodium iron phosphate, sodium nickel phosphate, sodium cobalt phosphate, sodium manganese phosphate, and sodium vanadium phosphate.

Examples of the compound which can be used as the sodium lithium transition metal phosphate are compounds such as sodium lithium iron phosphate, sodium lithium nickel phosphate, sodium lithium cobalt phosphate, sodium lithium manganese phosphate, and sodium lithium vanadium phosphate.

Using the manufacturing method disclosed in the present invention, a large amount of positive electrode active material with few variations, having a highly uniform surface condition, micro-size, and high performance can be obtained.

DETAILED DESCRIPTION OF THE INVENTION

Hereinafter, embodiments of the present invention are described with reference to the drawings. However, the present invention is not limited to the following description. It will be readily appreciated by those skilled in the art that various changes and modifications are possible without departing from the spirit and the scope of the present invention. Therefore, the present invention should not be construed as being limited to the following description of the embodiments. Note that reference numerals denoting the same portions are commonly used in different drawings.

Embodiment 1

In this embodiment, a positive electrode active material which is an embodiment of the present invention will be described using FIG. 1.

As the positive electrode active material, there is lithium transition metal oxide, sodium transition metal oxide, lithium sodium transition metal oxide, lithium transition metal phosphate, sodium transition metal phosphate, and sodium lithium transition metal phosphate. As the transition metal, one or a plurality of iron, nickel, cobalt, manganese, vanadium, chromium, or titanium is preferred.

Examples of the compound which can be used as the lithium transition metal oxide are compounds such as lithium cobalt oxide, lithium nickel oxide, lithium manganese oxide, lithium cobalt vanadium oxide, and lithium nickel vanadium oxide.

Examples of the compound which can be used as the sodium transition metal oxide are compounds such as sodium cobalt oxide, sodium nickel oxide, sodium manganese oxide, sodium cobalt vanadium oxide, and sodium nickel vanadium oxide.

Examples of the compound which can be used as the lithium sodium transition metal oxide are compounds such as sodium lithium cobalt oxide, sodium lithium nickel oxide, sodium lithium manganese oxide, sodium lithium cobalt vanadium oxide, and sodium lithium nickel vanadium oxide.

Examples of the compound which can be used as the lithium transition metal phosphate are compounds such as lithium iron phosphate, lithium cobalt phosphate, lithium nickel phosphate, lithium manganese phosphate, and lithium vanadium phosphate.

Examples of the compound which can be used as the sodium transition metal phosphate are compounds such as sodium iron phosphate, sodium cobalt phosphate, sodium nickel phosphate, sodium manganese phosphate, and sodium vanadium phosphate.

Examples of the compound which can be used as the sodium lithium transition metal phosphate are compounds such as sodium lithium iron phosphate, sodium lithium cobalt phosphate, sodium lithium nickel phosphate, sodium lithium manganese phosphate, and sodium lithium vanadium phosphate.

In the present embodiment, an embodiment of a positive electrode active material of a secondary battery disclosed in the present invention, which uses lithium iron phosphate ($LiFePO_4$), will be described.

Figure 1:
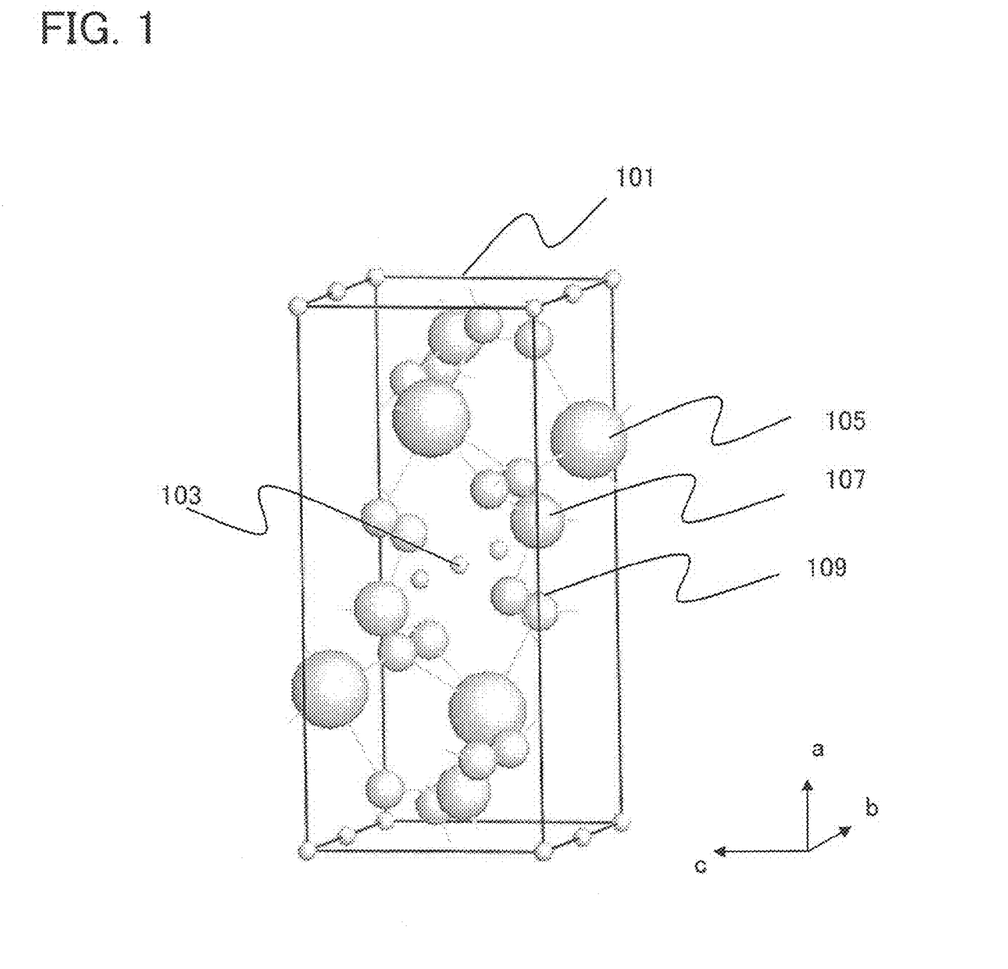
FIG. 1 is a schematic diagram of a crystal structure for sodium iron phosphate having an olivine structure.

FIG. 1 shows a unit cell 101 for lithium iron phosphate ($LiFePO_4$) of olivine structure. A lithium iron phosphate of olivine structure is an orthorhombic crystal structure, and includes four formula units of lithium iron phosphate ($LiFePO_4$) within a unit cell. The basic framework of the olivine structure is a hexagonal close-packed structure of an oxide ion, in which lithium, iron and phosphorus are located in the close-packed gaps.

Further, the lithium iron phosphate ($LiFePO_4$) of olivine structure has a tetrahedral site and two kinds of octahedral sites. The tetrahedral site has 4 oxygen atoms in the vertices. The octahedral sites have 6 oxygen atoms in the vertices. Phosphorus 107 is located at the center of the tetrahedral site, and lithium 103 or iron 105 is located at the center of the octahedral sites. The octahedral site with the lithium 103 located at the center is called a M1 site, and the octahedral site with the iron 105 located at the center is called a M2 site. The M1 site is arranged one-dimensionally in a b-axis direction. In other words, the lithium 103 is arranged one-dimensionally in a <010> direction. Note that for sake of simplicity, bonds between the lithium 103 and other ions or atoms are not shown by lines.

Additionally, the iron 105 of neighboring M2 sites are bonded in a zigzag shape with an oxygen 109 interposed therebetween. Also, the oxygen 109 bonded between the iron 105 of the neighboring M2 sites, is also bonded to the phosphorus 107 of the tetrahedral site. For this reason, the bond of iron-oxygen-phosphorus is continuous.

Note that the lithium iron phosphate of olivine structure may be distorted. Furthermore, regarding the lithium iron phosphate, the composition ratio of the lithium, the iron, the phosphorus, and the oxygen is not limited to 1:1:1:4. Also, as the transition metal (M) of the lithium transition metal phosphate ($LiMPO_4$), a transition metal which has an ionic radius that is larger than that of a lithium ion may be used. For example, there is nickel, cobalt, or manganese.

In the positive electrode active material shown in FIG. 1, since even iron phosphate alone is stable, diffusion of lithium ions is easy, and the aforesaid lithium ion capable of diffusion contributes to an electrical conduction. Also, since the lithium ions which contribute to an electrical conduction are arranged one-dimensionally in a b-axis direction, the diffusibility of the lithium ions is increased. Namely, since the diffusive resistance of the lithium ions can be reduced, the drift of the lithium ions becomes faster. For this reason, by using lithium iron phosphate in the positive electrode active material, an internal resistance of the secondary battery is reduced, and a high output power of the secondary battery can be achieved.

At least the diffusibility of the lithium ions is increased by the lithium ions which contribute to an electrical conduction being arranged one-dimensionally in a <010> direction (b-axis direction). Namely, since the diffusive resistance of the lithium ions can be reduced, the drift of the lithium ions becomes faster.

Next, a manufacturing method for the secondary battery positive electrode active material disclosed in the present invention will be described.

First, lithium transition metal phosphate of olivine structure is manufactured. Here, as an example, the case of manufacturing lithium iron phosphate of olivine structure is explained; however, an embodiment of the present invention is not limited to the lithium iron phosphate. Alternatively, it is not always necessary to be of olivine structure, a material including another transition metal (e.g., nickel, cobalt, and manganese) instead of the iron may be used.

The lithium iron phosphate of olivine structure can be manufactured by mixing, for example, iron or a compound including iron, a phosphate or a compound including phosphate, and a compound including lithium, after that, placing the mixed compound in an airtight container which transmits a microwave, and irradiating the microwaves to the airtight container.

As the compound including iron, for example, iron oxyhydroxide, iron(II) oxide, iron(III) oxide, iron(II) oxalate dihydrate, or iron chlorides can be used. Additionally, a compound including iron that has a microcrystal structure can be used. By using the compound including iron that has a microcrystal structure, a particle size of the formed lithium iron phosphate can be approximately several nanometers.

As the compound including phosphate, for example, phosphate, phosphorus pentoxide, diammonium hydrogen phosphate, or ammonium dihydrogen phosphate can be used. In particular, it is preferable to use the phosphate or the phosphorus pentoxide since a strong acid condition can be maintained in a process of dissolving iron, and since the generation of the ammonia gas can be suppressed.

As the compound including lithium, lithium hydroxide and lithium hydroxide hydrate can be used.

Here, as a manufacturing process of the lithium iron phosphate of olivine structure, either an aqueous solution of the aforesaid iron or the compound including iron, the phosphate or the compound including phosphate, and the compound including lithium is put into an airtight container made of fluorine resin, and a microwave is irradiated, or, the aforesaid iron or the compound including iron, the phosphate or the compound including phosphate, and the compound including lithium, are mixed with a solvent including water, and the liquid mixture is put into an airtight container made of fluorine resin, and a microwave is irradiated. Since the fluorine resin transmits a microwave, the aqueous solution is heated by the vibration of water molecules from the microwave, and the water evaporates. Because the water is evaporated, a pressure in the airtight container is increased, and a high pressure condition is formed in the airtight container. Additionally, in the airtight container under the high pressure condition, by reacting the aforesaid iron or the compound including iron, the phosphate or the compound including phosphate, and the compound including lithium, a crystal grain of good quality lithium iron phosphate having a highly uniform surface condition in which a grain size is several tens of nanometers or less can be manufactured. In other words, a crystal grain of good quality lithium iron phosphate having a highly uniform surface condition in which a grain size is several tens of nanometers or less can be manufactured by a hydrothermal reaction under high pressure. Here, a molar ratio of Li:Fe:P is not necessarily a compositional ratio of 1:1:1, and slightly varying the compositional ratio results in the surface of the crystal grain of the lithium iron phosphate being modified.

Note that here, either an aqueous solution of, or in a solvent including water, the aforesaid iron or the compound including iron, the phosphate or the compound including phosphate, and the compound including lithium, are mixed in advance, that liquid mixture is then put in an airtight container, and a microwave is irradiated. Alternatively, either an aqueous solution of, or in a solvent including water, the aforesaid iron or the compound including iron, the phosphate or the compound including phosphate, and the compound including lithium, may be put in an airtight container and then mixed, and after the liquid mixture is formed, a microwave is irradiated.

In a similar manner, by using sodium hydroxide or sodium hydroxide hydrate instead of the lithium hydroxide and the lithium hydroxide hydrate, which are materials that include lithium, good quality sodium iron phosphate having a highly uniform surface condition in which a grain size is several tens of nanometers or less can be manufactured.

Figure 2:
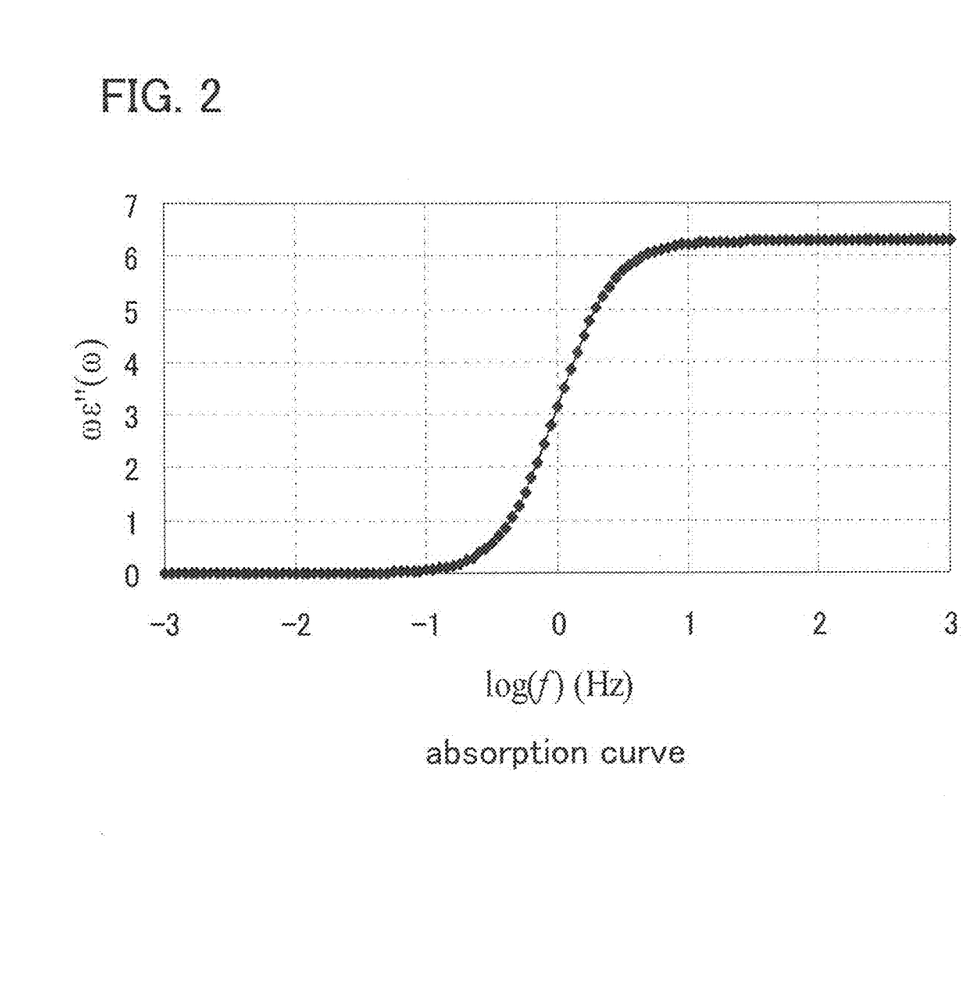
FIG. 2 is a graph showing an absorption curve of water with respect to a frequency of an electromagnetic wave in accordance with calculation results.
Figure 3:
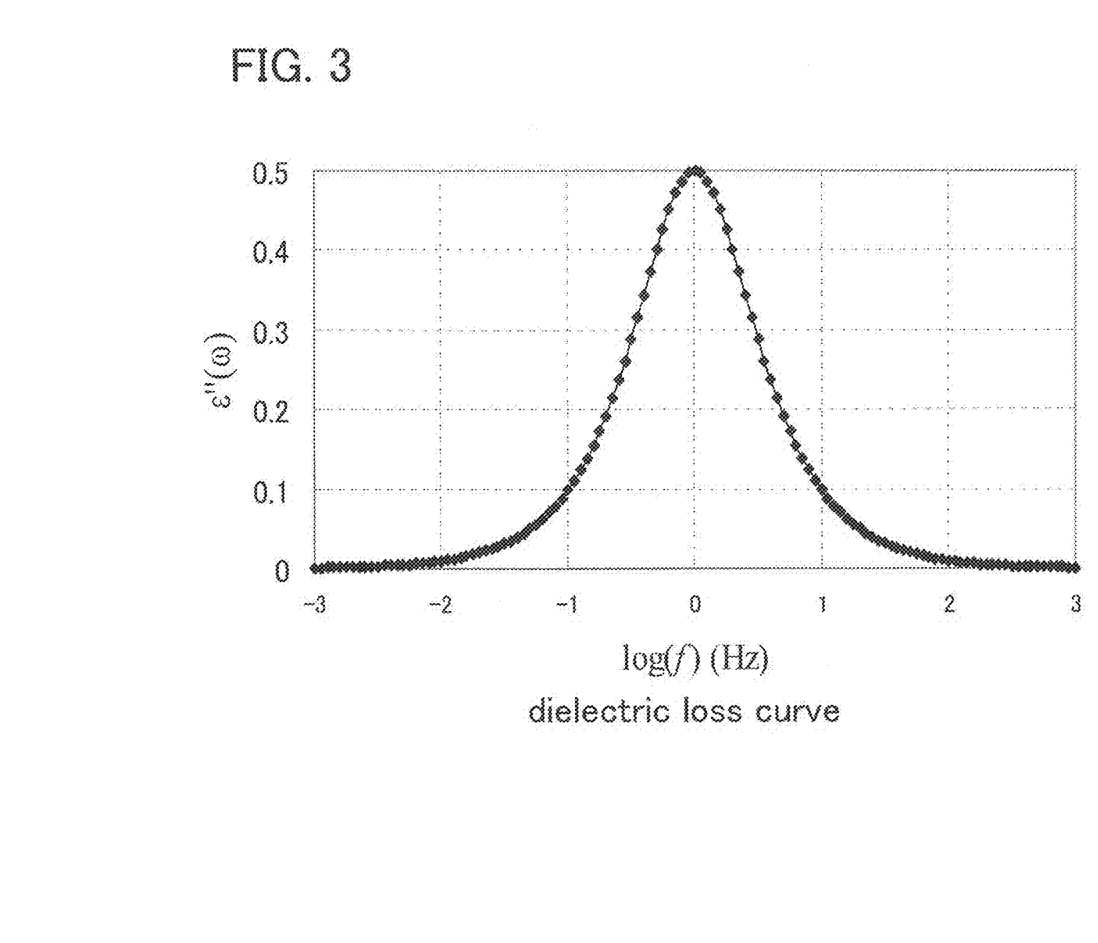
FIG. 3 is a graph showing dielectric loss of water with respect to a frequency of an electromagnetic wave in accordance with calculation results.

By using microwaves, it is possible to use the heating effect of the microwaves, and water can be uniformly and rapidly heated. By heating with microwaves, it is possible to produce a chemical reaction different from that caused by general heating using so-called radiant heat, for example, heating with a heater. The molecular motion which occurs in a microwave region is a random motion in which molecules rotate and diffuse, which leads to heating effects. On the other hand, it is needless to say that there are also nonthermal effects. The dielectric relaxation characteristic of water is in a frequency band of about 25 GHz. When the complex dielectric constant is $\in^* = \in' - i\in''$, an imaginary part $\in''$ is called dielectric loss. When irradiation with an electromagnetic wave with a frequency where the value of the imaginary part $\in''$ is not zero is performed, the electromagnetic wave is absorbed into a dielectric. The frequency of the microwave is 2.4 GHz, which is approximately one digit smaller than the frequency band that causes the dielectric loss of water, but because the frequency band that causes the dielectric loss of water extends from a low frequency which is equal to or less than a few GHz to a high frequency which is in a far-infrared region, the electromagnetic wave within this region is absorbed into water and the temperature of water can be increased. Microwave provides energy to a base of low frequency for a dielectric loss of water, thus heating is performed. It is known that water is represented by Debye relaxation. FIG. 2 shows an absorption curve in the case of using Debye relaxation. In FIG. 2, the horizontal axis represents the logarithm of the frequency (f) of the electromagnetic wave, and the vertical axis represents the value obtained by multiplying a dielectric loss (an imaginary part $\in''$) by an angular frequency $\omega$. FIG. 3 shows a dielectric loss of a frequency of the corresponding electromagnetic wave. The value of the absorption curve with a frequency in a peak of the dielectric loss is approximately half the maximum value, and the absorption coefficient is saturated at the base of a loss spectrum on the high frequency side. It can be found that power with a frequency with which the absorption curve shown in FIG. 2 is somewhat large is preferably applied in consideration of effective heating.

In this manner, the positive electrode active material having a grain size that is several tens of nanometers or less, few variations, a highly uniform surface condition, microsize, and high performance, can be manufactured.

Furthermore, the methods and structures described in the present embodiment can be combined as appropriate with any of the methods and structures described in the other embodiments.

Embodiment 2

In the present embodiment, an embodiment of the present invention regarding a manufacturing method for a positive electrode active material, which is different from that of Embodiment 1, will be described. The positive electrode active material described in this embodiment uses lithium iron phosphate (LiFePO$_4$) which is the same as that of Embodiment 1.

As an example of manufacturing lithium transition metal phosphate of olivine structure, the case of manufacturing lithium iron phosphate of olivine structure is described but is not limited thereto; thus, it is not necessary to be of olivine structure, and it may include another transition metal (e.g., nickel, cobalt, and manganese) instead of the iron.

As the material including iron, for example, iron oxyhydroxide, iron(II) oxide, iron(III) oxide, iron oxalate, iron chloride, or hydrates of these can be used.

As the material including a phosphate, for example, phosphorus pentoxide, diammonium hydrogen phosphate, and ammonium dihydrogen phosphate, or hydrates of these can be used. As the material including lithium, lithium hydroxide and lithium hydroxide hydrate can be used.

The difference from the manufacturing process of the lithium iron phosphate of olivine structure described in Embodiment 1 is that at least one of the aforesaid materials including iron, phosphate, and lithium, in which at least one is a compound including a hydrate, and in which microwave is directly irradiated to a solid compound of the material including the iron, phosphate and lithium. By using the method described in the present embodiment, a large amount of good quality lithium iron phosphate having a highly uniform surface condition in which a grain size is several tens of nanometers or less, can be manufactured at lower cost. Here, the molar ratio of Li:Fe:P is not necessarily a compositional ratio of 1:1:1, and slightly varying the compositional ratio results in the surface of the crystal grain being modified.

In a similar manner, by using sodium hydroxide or sodium hydroxide hydrate instead of the lithium hydroxide and the lithium hydroxide hydrate, which are materials that include lithium, good quality sodium iron phosphate having a highly uniform surface condition in which a grain size is several tens of nanometers or less, can be manufactured.

In this manner, the positive electrode active material having a grain size that is several tens of nanometers or less, few variations, a highly uniform surface condition, microsize, and high performance, can be manufactured.

Furthermore, the methods and structures described in the present embodiment can be combined as appropriate with any of the methods and structures described in the other embodiments.

Embodiment 3

In the present embodiment, an embodiment of the present invention regarding a positive electrode active material, which is different from those of Embodiments 1 and 2, will be explained. A positive electrode active material described in the present embodiment is sodium lithium transition metal phosphate (Na$_x$Li$_{(1-x)}$MPO$_4$ (0<x<1)), and as the transition metal (M), iron, cobalt, nickel, manganese, and the like can be used. Herein, sodium lithium iron phosphate (Na$_x$Li$_{(1-x)}$FePO$_4$ (0<x<1)) using iron as a typical example of the transition metal (M), is used for explanation.

Figure 4:
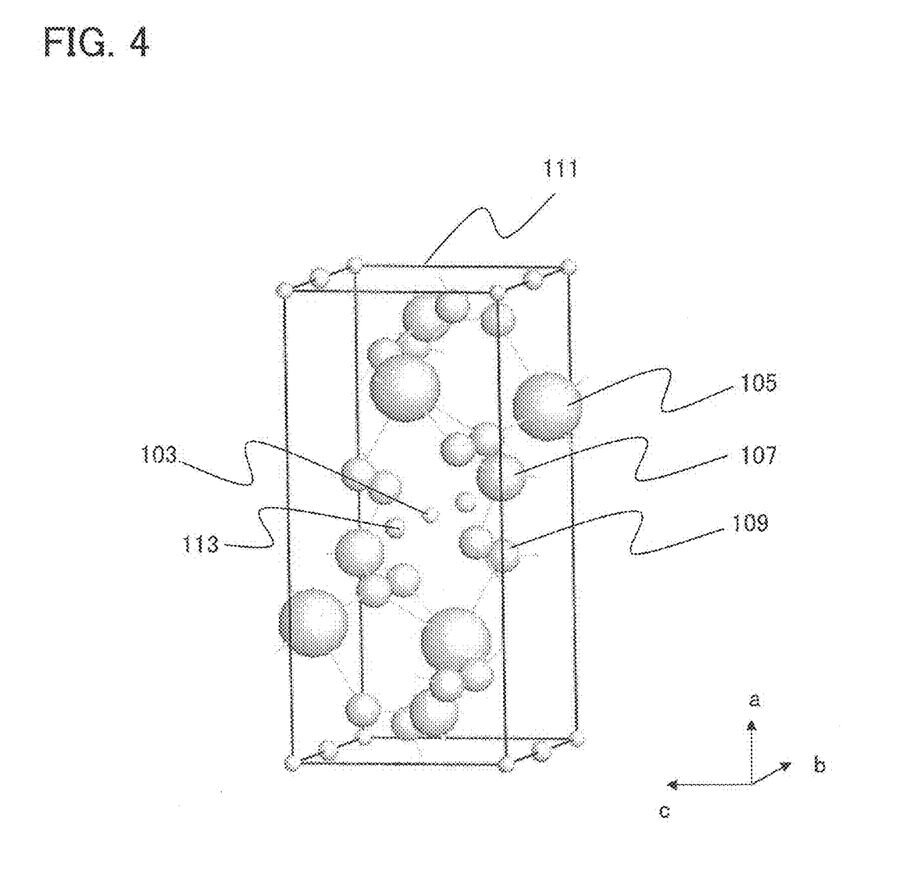
FIG. 4 is a schematic diagram of a crystal structure for sodium lithium iron phosphate having an olivine structure.

FIG. 4 shows a unit cell 111 for sodium lithium iron phosphate (Na$_x$Li$_{(1-x)}$FePO$_4$ (0<x<1)) of olivine structure. Sodium lithium iron phosphate of olivine structure is an orthorhombic crystal structure, and includes four formula units of sodium lithium iron phosphate (Na$_x$Li$_{(1-x)}$FePO$_4$ (0<x<1)) within a unit cell.

A sodium 113 and a lithium 103 of the sodium lithium iron phosphate (Na$_x$Li$_{(1-x)}$FePO$_4$ (0<x<1)), similar to those in the sodium iron phosphate shown in FIG. 1, are arranged one-dimensionally in a b-axis direction. That is to say, the sodium 113 and the lithium 103 are arranged one-dimensionally in a <010> direction. Note that for sake of simplicity, bonds between the sodium 113, the lithium 103 and other ions or atoms are not shown by lines.

Note that the sodium lithium iron phosphate of olivine structure may be distorted. Furthermore, as the transition metal (M) of the sodium lithium transition metal phosphate (Na$_x$Li$_{(1-x)}$MPO$_4$), a transition metal which has an ionic radius that is larger than that of the sodium ion and the lithium ion may be used. For example, there is nickel, cobalt, or manganese.

In the positive electrode active material shown in FIG. 4, since even iron phosphate alone is stable, diffusion of the sodium ions and the lithium ions is easy, and the aforesaid sodium ions and lithium ions capable of diffusion contribute to an electrical conduction. Also, since the sodium ions and the lithium ions which contribute to an electrical conduction are arranged one-dimensionally in a b-axis direction, the diffusibility of the sodium ions and the lithium ions is increased. Namely, since the diffusive resistance of the sodium ions and the lithium ions can be reduced, the drift of sodium ions and the lithium ions becomes faster. Also, since lithium is used with the sodium, and because the amount of lithium used can be reduced; the positive electrode active material can be highly practical at low cost. For this reason, by using sodium lithium iron phosphate in the positive electrode active material, an internal resistance of the secondary battery is reduced, and a high output power of the secondary battery can be achieved.

Next, a manufacturing method for the abovementioned secondary battery positive electrode active material will be explained.

As the material including iron, for example, iron oxyhydroxide, iron(II) oxide, iron(III) oxide, iron oxalate, iron chloride, or hydrates of these can be used.

As the material including a phosphate, for example, phosphorus pentoxide, diammonium hydrogen phosphate, ammonium dihydrogen phosphate, or hydrates of these can be used. As the material including lithium, lithium hydroxide or lithium hydroxide hydrate can be used. As the material including sodium, sodium hydroxide or sodium hydroxide hydrate can be used.

As a manufacturing process of the lithium iron phosphate of olivine structure, the aforesaid material includes iron, phosphate, lithium, and sodium, in which at least one of these is a compound including a hydrate, and a solid mixture of the aforesaid material including iron, phosphate, lithium, and sodium is directly irradiated with a microwave. According to this process, a large amount of good quality sodium lithium iron phosphate having a highly uniform surface condition in which a grain size is several tens of nanometers or less, can be manufactured at lower cost. Here, the molar ratio of Fe:P is not necessarily a compositional ratio of 1:1, and slightly varying the compositional ratio results in the surface of the crystal grain being modified.

Also, in a method of manufacturing the positive electrode active material of the present embodiment, while not limited thereby, the sodium-lithium ion replacement process may be performed once after a battery is assembled. Here, the method of performing the sodium-lithium ion replacement process after a battery is assembled is explained next.

First, lithium iron phosphate of olivine structure is manufactured in a manner similar to that described above, and by using the obtained lithium iron phosphate of olivine structure, a positive electrode is manufactured. Also, other than the positive electrode, a negative electrode and an electrolyte are prepared, and then combined with the manufactured positive electrode to manufacture a battery. Additionally, at least a portion of the Li ions is extracted from the lithium iron phosphate of olivine structure by applying a voltage to the manufactured battery. After this step, by performing the sodium-lithium ion replacement process, at least a portion of the lithium ions which forms the manufactured lithium iron phosphate can also be replaced with sodium ions.

As described above, first, the lithium iron phosphate of olivine structure is manufactured, and by replacing at least the portion of the lithium ions which forms the manufactured lithium iron phosphate with sodium ions, the positive electrode active material of the sodium lithium iron phosphate of olivine structure can be manufactured.

In this manner, the positive electrode active material having a grain size that is several tens of nanometers or less, few variations, a highly uniform surface condition, micro-size, and high performance, can be manufactured.

Embodiment 4

A secondary battery using the positive electrode active material which is one embodiment of the present invention described in any of the above embodiments, is described in the present embodiment.

Figure 5:
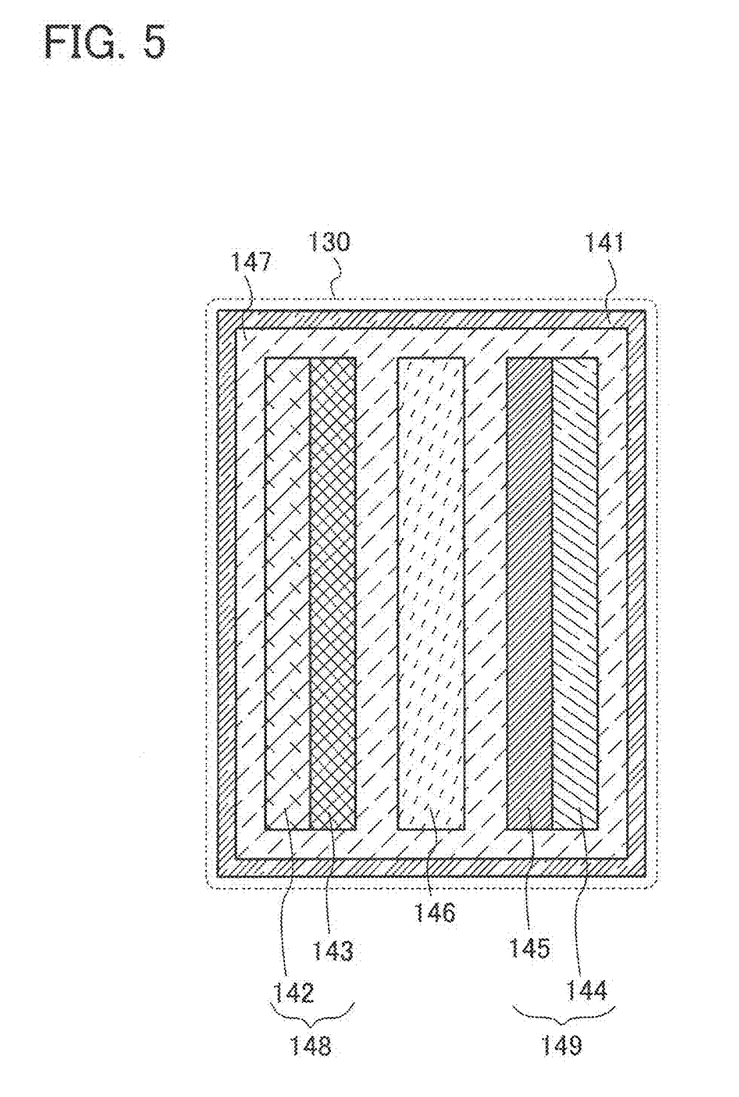
FIG. 5 is a schematic diagram of a structure for a secondary battery.

A structure of a secondary battery 130 is shown in FIG. 5. The secondary battery 130 has a housing 141, a positive electrode 148 including a positive electrode current collector 142 and a positive electrode active material 143, a negative electrode 149 including a negative electrode current collector 144 and a negative electrode active material 145, a separator 146 between the positive electrode 148 and the negative electrode 149, and an electrolyte 147.

As a material of the positive electrode current collector 142 of the secondary battery 130, an element such as aluminum (Al) and titanium (Ti), may be used alone or in a compound thereof.

The positive electrode active material which is an embodiment of the present invention described in Embodiment 1 to Embodiment 3 is used as a material for the positive electrode active material 143 of the secondary battery 130.

As a material for the negative electrode current collector 144 of the secondary battery 130, copper (Cu), aluminum (Al), nickel (Ni), titanium (Ti) and the like, may be used alone or in a compound thereof.

As a material of the negative electrode active material 145 of the secondary battery 130, a material capable of Li ion or Na ion insertion and extraction, such as a compound of Li or a compound of Na, may be used. As a specific material capable of Li ion or Na ion insertion and extraction, there are, for example, carbon, silicon, and silicon alloy. As the carbon capable of Li ion or Na ion insertion and extraction, there is a carbon material such as a fine graphite powder or a graphite fiber.

Additionally, when a silicon material is used as the negative electrode active material 145 of the secondary battery 130, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased.

Also, an alloy including tin (Sn) may be used as the negative electrode active material 145 of the secondary battery 130.

Li ions or Na ions are inserted and react with a layer formed of the aforesaid material capable of Li ion or Na ion insertion and extraction, and the negative electrode active material 145 is formed.

As the separator 146, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. However, a material which does not dissolve in the later described electrolyte 147, should be selected.

More specific examples of materials for the separator 146 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in a combination.

Also, the electrolyte 147 of the secondary battery 130 includes Li ions or Na ions, and these Li ions and Na ions are responsible for electrical conduction. The electrolyte 147 includes, for example, a solvent and a lithium salt or a sodium salt dissolved in the solvent. Examples of the lithium salts include lithium chloride (LiCl), lithium fluoride (LiF), lithium perchlorate (LiClO$_4$), lithium fluoroborate (LiBF$_4$) and the like; examples of the sodium salt include sodium chloride (NaCl), sodium fluoride (NaF), sodium perchlorate (NaClO$_4$), and sodium fluoroborate (NaBF$_4$), all of which can be used either alone or in combination in the electrolyte 147. Note that in the present embodiment, an electrolyte including a solvent and a sodium salt or a lithium salt is used; however, a solid electrolyte may be used as necessary.

Examples of the solvent for the electrolyte 147 include cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof, all of which can be used either alone or in combination.

In the manner as described above, the secondary battery using the secondary battery positive electrode active material, which is an embodiment of the present invention, can be formed.

This application is based on Japanese Patent Application Ser. No. 2009-184015 filed with Japan Patent Office on Aug. 7, 2009, the entire contents of which are hereby incorporated by reference.

What is claimed is:

1. A method of manufacturing a positive electrode active material, comprising the steps of:
providing a solid in an airtight container which is configured to transmit a microwave, the solid consisting essentially of:

a transition metal compound;
a compound including lithium; and
a phosphate, wherein at least one of the transition metal compound, the compound including lithium and the phosphate is a hydrate, directly irradiating the solid with a microwave to evaporate water in the hydrate, thereby increasing pressure in the airtight container and synthesizing a lithium transition metal phosphate by hydrothermal reaction;

after the irradiating, preparing a battery comprising a positive electrode comprising the solid, a negative electrode, and an electrolyte comprising a sodium salt;

applying a voltage to the battery; and performing a sodium-lithium ion replacement of the solid in the battery.

2. The method of manufacturing the positive electrode active material according to claim 1, wherein the transition metal compound includes a transition metal selected from the group consisting of iron, cobalt, nickel, manganese, and vanadium, and wherein the synthesized lithium transition metal phosphate is one of lithium iron phosphate, lithium cobalt phosphate, lithium nickel phosphate, lithium manganese phosphate, and lithium vanadium phosphate.

3. The method of manufacturing the positive electrode active material according to claim 1, wherein the airtight container contains fluorine resin.

4. The method of manufacturing the positive electrode active material according to claim 1, wherein the solid consists of the transition metal compound, the compound including lithium and the phosphate.

5. A method of manufacturing a positive electrode active material, comprising the steps of:

providing a solid in an airtight container which is configured to transmit a microwave, the solid consisting essentially of:

a transition metal compound;
a first compound including lithium;
a second compound including sodium;
a phosphate, wherein at least one of the transition metal compound, the first compound, the second compound and the phosphate is a hydrate, directly irradiating the solid with a microwave to evaporate water in the hydrate, thereby increasing pressure in the airtight container and synthesizing a sodium lithium transition metal phosphate by hydrothermal reaction;

after the irradiating, preparing a battery comprising a positive electrode comprising the solid, a negative electrode, and an electrolyte comprising a sodium salt;

applying a voltage to the battery; and performing a sodium-lithium ion replacement of the solid in the battery.

6. The method of manufacturing the positive electrode active material according to claim 5, wherein the transition metal compound includes a transition metal selected from the group consisting of iron, cobalt, nickel, manganese, and vanadium, and wherein the synthesized sodium lithium transition metal phosphate is one of sodium lithium iron phosphate, sodium lithium cobalt phosphate, sodium lithium nickel phosphate, sodium lithium manganese phosphate, and sodium lithium vanadium phosphate.

7. The method of manufacturing the positive electrode active material according to claim 5, wherein the airtight container contains fluorine resin.

8. The method of manufacturing the positive electrode active material according to claim 5, wherein the solid consists of the transition metal compound, the first compound, the second compound and the phosphate.

\* \* \* \* \*